United States Patent Office 3,335,174
Patented Aug. 8, 1967

3,335,174
PREPARATION OF DIOLS AND ALIPHATIC CARBOXYLIC ACID ESTERS THEREOF FROM OLEFINS
Charles J. Norton, Denver, Colo., assignor to Marathon Oil Company, Findlay, Ohio, a corporation of Ohio
No Drawing. Filed Mar. 30, 1964, Ser. No. 355,909
5 Claims. (Cl. 260—497)

This invention relates to a process for making diols and esters of unsaturated compounds, and more particularly to a process for the preparation of such compounds utilizing a water hydrolyzable metal halide or oxyhalide catalyst.

The use of metal oxides of the Groups V–b, VI–b, and VIII as catalysts for the hydroxylation and esterification of olefinic hydrocarbons by oxidation with hydrogen peroxide in aqueous lower aliphatic acids is known to the art. I have now invented a process whereby water hydrolyzable metal halides and metal oxyhalides of the groups V–b, VI–b, and VIII, and particularly those of tungsten, vanadium, molybdenum, and osmium, are used as hydroxylation and esterification catalysts. These catalysts are more easily handled, have less toxicity, and are more soluble in the reaction medium than the corresponding oxides. The concentration of the catalyst can range from 0.001% to 10%, and preferably is in the range of about 0.01% to 2.0% of the aqueous reaction medium. Solvents for the catalysts are lower aliphatic hydrocarbon acids, preferably acids such as glacial formic, acetic, and propionic acids.

Terminal or internal olefins can be used in the process in the absence of excessive steric hindrance and in the absence of attached functional groups which are chemically reactive with other constituents of the reaction mixture. For example, isocyanates react with the acids to form urethanes. Alcohols, and in some cases nitriles, are also chemically active and would also form undesirable compounds. Compounds such as 2,3-methyl-2-butene are sterically hindered from reacting. Olefinic compounds, for example, such as cyclohexene; 1,4-cyclohexadiene; olefinic α,ω-dicarboxylic acids; ketones; and other longer chain olefins will work.

The hydrogen peroxide concentration in the reaction medium can range from 1% to 60%, and preferably should be maintained in concentrations of from 5% to 30%. Reaction temperatures range from about 0° C. to 150° C., and are preferably about 20° C. to 80° C. Reaction time can vary from 15 minutes to more than 10 hours, but is preferably from about ½ to 4 hours. Substantial amounts of epoxide result when short reaction times are used. With longer reaction times, the half ester of the diol is predominantly formed. An increase in the lower aliphatic acid content causes both positions of the diol to be esterified.

The following examples more fully explain my invention. It is to be understood, however, that the invention is not to be limited to specific conditions or details set forth in these examples, except insofar as such limitations are specified in the appended claims.

*Example I*

Aqueous 30% hydrogen peroxide (14.5 ml.) and 45 ml. of glacial acetic acid were heated at 75° C. for one hour. Tungsten hexachloride (0.34 g.) was added. The solution was cooled and transferred to a 125 ml. flask, and 10 ml. of cyclohexene added with vigorous stirring and cooling in an ice bath. The product was extracted with ether. The ether extract was treated with basic aqueous silver nitrate solution, heated to destroy the peroxide, and dried over anhydrous magnesium sulfate. Concentration on a steam bath gave 3.2 g. of clear viscous oil. The yield of the half acetate of cyclohexene and trans-diol was about 22%.

*Example II*

Aqueous 30% hydrogen peroxide (14.5 ml.) and 45 ml. of glacial propionic acid are heated at 75° C. for 1 hour. Osmium trichloride (0.3 g.) is added to the solution. The solution is cooled and transferred to a 125 ml. flask, and 10 ml. of 1-hexene added with vigorous stirring and cooling in an ice bath. The product is extracted with ether. The ether extract is treated with basic aqueous silver nitrate solution, heated to destroy the peroxide, and dried over anhydrous magnesium sulfate. Concentration on a steam bath gives a clear viscous oil which is the half acetate and the trans-diol of 1-hexene.

*Example III*

Aqueous 30% hydrogen peroxide (14.5 ml.) and 45 ml. of glacial acetic acid are heated at 75° C. for 1 hour. Molybdenum oxytetrachloride (0.3 g.) is added to the solution. The solution is cooled and transferred to a 125 ml. flask, and 10 ml. of 2-methylpentene-2 added with vigorous stirring and cooling in an ice bath. The product is extracted with ether, treated with basic aqueous silver nitrate solution, heated to destroy the peroxide, and dried. Concentration on a steam bath gives a clear viscous oil which is the half acetate and the trans-diol of 2-methylpentene-2.

Now having described my invention, what I claim is:
1. In a process for hydroxylating compounds containing at least one olefinic linkage with aqueous hydrogen peroxide in the presence of a lower aliphatic hydrocarbon acid and a metal salt catalyst, the step comprising: contacting said compounds containing at least one olefinic linkage with aqueous hydrogen peroxide and a lower aliphatic hydrocarbon acid in the presence of a catalytic amount of at least one water hydrolyzable metal salt catalyst selected from the class consisting of the halides or oxyhalides of tungsten, vanadium, molybdenum, and osmium.
2. The process as in claim 1 wherein the catalyst is tungsten hexachloride.
3. The process as in claim 1 wherein the solvent is selected from the group consisting of formic, acetic, and propionic acids.
4. The process as in claim 3 wherein the hydrogen peroxide concentration is from about 5 to about 30%, by weight, of said mixture and the metal catalyst concentration is in the range of about 0.01 to about 0.2%, by weight, of said mixture and the reaction is carried out at temperatures ranging from about 20° to about 80° C.
5. The process as in claim 4 wherein the compound containing an olefinic bond is cyclohexene.

References Cited
UNITED STATES PATENTS
2,613,223   10/1952   Young _____ 260—631

OTHER REFERENCES
Mugdan et al.: Catalytic Hydroxylation of Unsaturated Compounds, Jour. Chem. Soc. (London), 1949; pp. 2988–3000.

LORRAINE A. WEINBERGER, *Primary Examiner.*
VIVIAN GARNER, *Assistant Examiner.*